United States Patent [19]

O'Neill

[11] Patent Number: 5,169,114
[45] Date of Patent: Dec. 8, 1992

[54] ADJUSTABLE MOUNTING AND SECURITY DEVICE FOR APPLIANCES

[76] Inventor: Edward O'Neill, 14284 Acapulco Rd., San Leandro, Calif. 94578

[21] Appl. No.: 724,111

[22] Filed: Jul. 1, 1991

[51] Int. Cl.⁵ .............................................. F16M 13/00
[52] U.S. Cl. ........................................ 248/551; 70/58; 248/316.4; 248/670; 248/680
[58] Field of Search ............... 248/551, 552, 553, 670, 248/680, 500, 316.4; 70/58

[56] References Cited

U.S. PATENT DOCUMENTS

| | | | |
|---|---|---|---|
| 1,884,370 | 10/1932 | Swanson | 248/316.4 X |
| 2,042,768 | 6/1936 | Bruns | 248/316.4 |
| 3,275,276 | 9/1966 | Johnson | 248/500 |
| 3,965,705 | 6/1976 | Nadler | 248/553 X |
| 4,079,604 | 3/1978 | Anderegg | 70/58 |
| 4,585,202 | 4/1986 | Parsekian | 248/500 X |
| 4,942,745 | 7/1990 | Jacobs et al. | 70/58 |
| 5,076,079 | 12/1991 | Monoson et al. | 248/553 X |

FOREIGN PATENT DOCUMENTS

| | | | |
|---|---|---|---|
| 65552 | 3/1945 | Denmark | 248/670 |
| 40208 | of 1902 | United Kingdom | 248/316.4 |

Primary Examiner—David L. Talbott
Attorney, Agent, or Firm—Niro, Scavone, Haller & Niro

[57] ABSTRACT

A supporting or supporting and security device is provided for mounting an appliance on a support surface, or for hanging an appliance from a wall or ceiling. The device includes a base having upper and lower portions, and pads that adhere the sides of the appliance. Generally L-shaped side brackets are adjustably connected to the base by use of threaded fastener means. The appliance is placed on the base and clamped between the side brackets. The side brackets include a generally vertical portion for retaining the pads, and a generally horizontal portion for sliding within the base assembly.

17 Claims, 2 Drawing Sheets

U.S. Patent    Dec. 8, 1992    Sheet 1 of 2    5,169,114
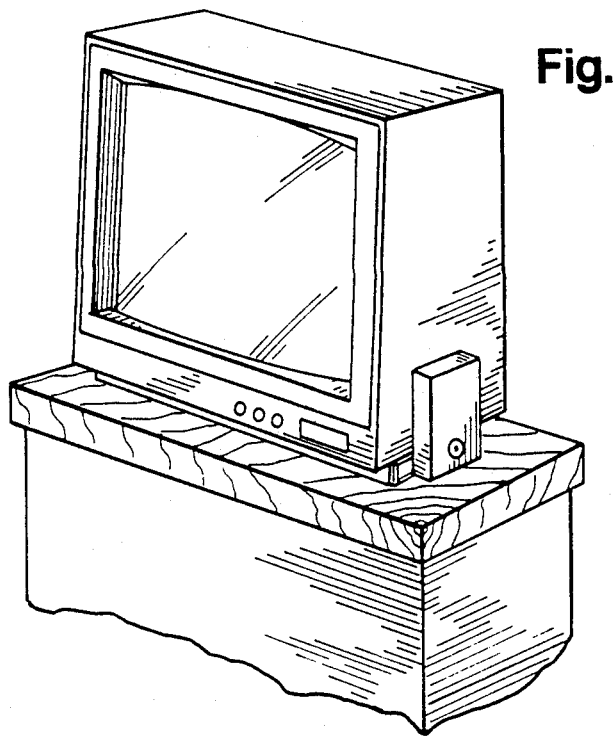
Fig. 1
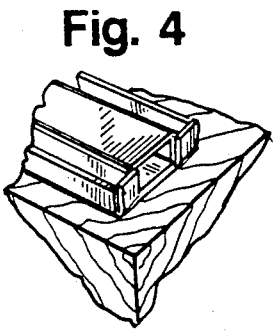
Fig. 4
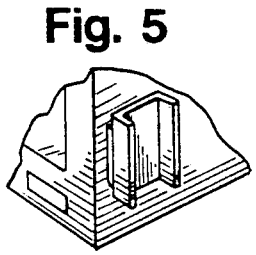
Fig. 5
Fig. 6
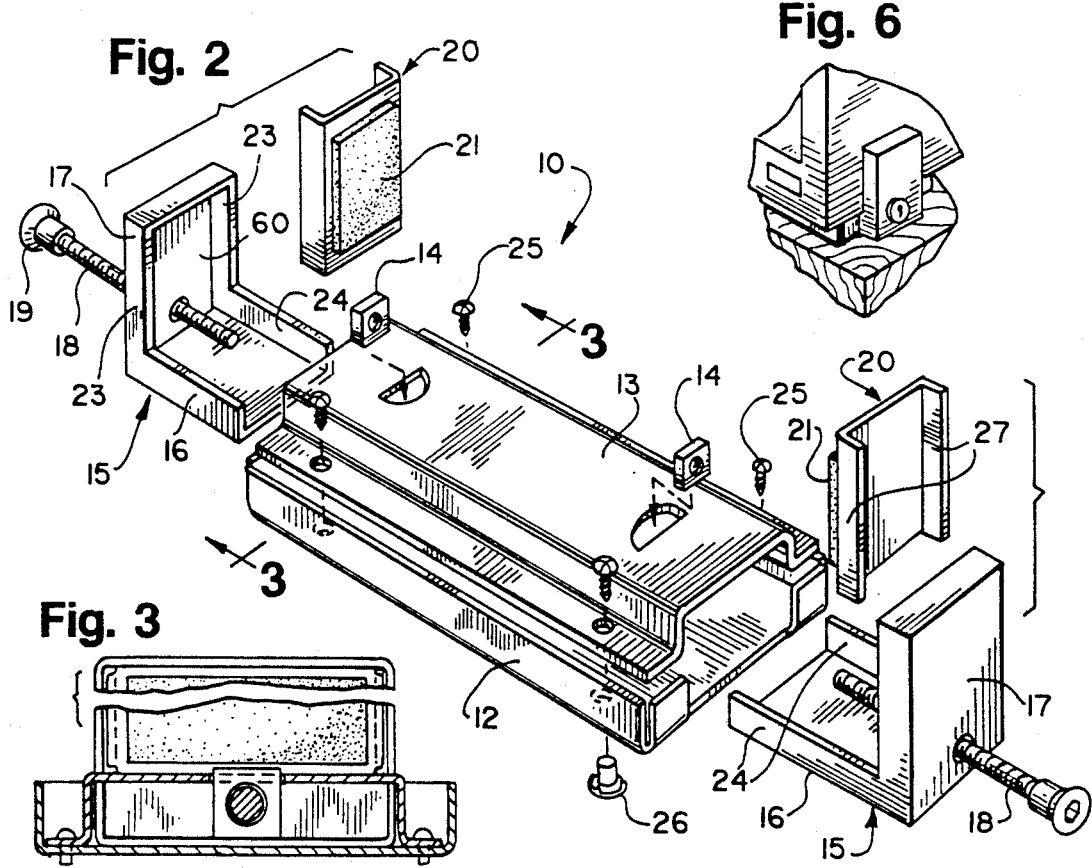
Fig. 2
Fig. 3

ADJUSTABLE MOUNTING AND SECURITY DEVICE FOR APPLIANCES

BACKGROUND OF THE INVENTION

The present invention relates to equipment mounting and security devices, especially ones that are adapted to secure various appliances, such as a television, to a support surface, such as an end table in a hotel room, or to a support arm.

Businesses, schools, hotels and other enterprises utilize a variety of appliances or equipment, including typewriters, word processors, computers and television sets, which are prone to theft problems. While these appliances are relatively expensive, it is not usually practical to constantly maintain the areas where these appliances are located under surveillance. For this reason these appliances often become a target for theft.

One common method of reducing the loss of this equipment has been to bolt the equipment to the surface to which it is mounted. This has been accomplished by utilizing a mounting bracket with a locked cover which cannot be easily removed. Examples of such security devices are disclosed in U.S. Pat. Nos. 3,724,798 and 3,850,392. However, these devices are relatively complicated, and are not easily adjustable for securing a variety of differently sized or shaped appliances.

Prior art devices also include devices in which the base of an appliance is adhesively mounted directly to a support surface. However, such a mounting allows the adhesive means to be scraped from the support surface by a knife or other means. Other devices include those in which the appliance is directly secured by fasteners or other means to the support surface, for which a pattern of holes or slots on the appliance must match a similar pattern on the support surface. Thus, should the appliance be moved or disengaged from the supporting device, the appliance is left in a defaced condition.

The prior art lacks a mounting and security device for both home and commercial applications which can be readily and easily attached to appliances of varying shapes and sizes, as well as being relatively inexpensive to manufacture and install. The device would be flexible enough to be used both by homeowners interested in mounting an appliance to a support surface as well as companies interested in more secure commercial anti-theft applications.

The device for home applications would not require that the appliance be bolted directly to a support surface, but would be supported by a base and adjustably secured between side brackets, with the base being connected to side brackets by threaded fasteners and the base being directly secured to a support surface or mounting arm. Missing from the prior art is the flexibility to interchange such devices for home or for commercial applications.

SUMMARY OF THE INVENTION

The present invention provides new advantages not found in currently available devices and overcomes the disadvantages associated with those devices, including the disadvantages discussed above.

An object, therefore, of the invention is to provide a new and improve mounting and security device for mounting an appliance on a support surface or to an arm extending from a wall or ceiling.

Another object of the invention is to provide a device which can adhesively fasten an appliance to an easily adjustable mounting assembly while eliminating the possibility that the adhesive can be removed by a knife or similar means.

A further object of the present invention is to provide a device having a base supporting the appliance and side brackets connected to that base which will adjustably clamp and retain the appliance.

A still further object of the present invention is to provide a security device having locking means for securing appliances of various sizes and shapes.

An additional object of the present invention is to provide a device of the character described which is adapted to be attached to a suitable, complementary holding arm.

In one embodiment of the invention, a security device is provided for mounting an appliance on a support surface, or for hanging an appliance from a wall or ceiling. The security device includes a base which supports the appliance; at least two side brackets disposed at opposite sides of the base; means for adjusting the spacing of the brackets to conform to the size of the appliance; and means for developing a frictional or adhesive force between the brackets and the appliance to affix the appliance in position on the base.

In a second embodiment of the present invention, a security device is provided which includes locking means. The adjusting means includes a first set of threaded fasteners which are insertable through the brackets, and are secured to a second set of threaded fasteners which are disposed in the base. The first set of threaded fasteners may include allen head tips, together with suitable locking means.

In a third embodiment of the present invention, the base is provided with upper and lower portions, with the upper portion constituting a supporting platform for the appliance and the lower portion adapted to secure to a support surface or a support arm. The side brackets include generally vertical and horizontal positions. Frictional or adhesive pads are also provided and are connected to the vertical portions of the side brackets. The horizontal portions of the side brackets are slidably insertable within the base.

Other objects, features and advantages of the invention will be apparent from the following detailed description taken in conjunction with the accompanying drawings.

DESCRIPTION OF THE DRAWINGS

The features of this invention which are believed to be novel are set forth with particularity in the appended claims. The invention, together with its objects and advantages thereof, may be best understood by reference to the following description taken in conjunction with the accompanying drawings, in which like reference numerals identify like elements in the figures and in which:

FIG. 1 is a perspective view of the present invention when fully assembled, showing the securably mounting of a television to a support surface.

FIG. 2 is a perspective view of various components of one embodiment of the present invention.

FIG. 3 is an end view taken along section line 3—3 of FIG. 2.

FIG. 4 is a perspective view of the upper and lower base sections illustrated in FIG. 2.

FIG. 5 is a perspective view of the padded insert and adhesive pad of the present invention affixed to the side of an appliance.

FIG. 6 is a perspective view of a portion of the side bracket of the present invention secured to the side of an appliance by locking means.

DETAILED DESCRIPTION OF THE PREFERRED EMBODIMENT

Figure 7:
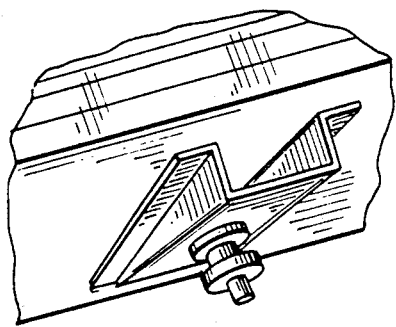
FIG. 7 is a perspective view of the present invention, illustrating a lower portion of the lower base section connected to a receiving arm.

Referring to the drawings in greater detail, a security device, generally designated 10, is illustrated for securing an appliance to a support surface. FIG. 1 shows one embodiment of the security device of the present invention, fully assembled and securably mounting a television to a support surface. "Inner" or "inwardly" or "inside", as used throughout this application, shall designate a direction toward the appliance, while "outer or "outwardly" or "outside" shall designate a direction away from the appliance.

Referring more particularly to FIG. 2, security device 10 has a metallic base, designated generally as 11, which includes a lower base section 12 and an upper base section 13. The lower base section 12 may be rigidly connected or welded to the upper base section 13; when these sections are joined they form a substantially closed compartment. Alternatively, threaded fasteners 25 may also be used to secure the lower section to the upper section. Any suitable means, such as security nut 26, may then be used to secure the fasteners 25 while preventing tampering. Threaded receiving means 14, preferably a nut 14 sold under the trademark TINNERMAN®, is also provided, and may be rigidly connected within the compartment to either an upwardly extending portion of lower base section 12 or a downwardly depending portion of upper base section 13.

Generally L-shaped side brackets 15 are also provided. Side brackets 15 include a generally horizontal portion 16 and a generally vertical portion 17. The generally vertical portion 17 of side bracket 15 includes an aperture for accommodating threaded fastener rod 18. Tip 19 of threaded fastener 18 may include a suitable "nonconventional" fastener head, such as the allen head tip shown. A generally channel-shaped padded insert 20 is also provided. The inner surface of padded insert 20 is provided with a foam adhesive pad 21 which can have a holding power of up to 60-70 pounds per square inch when compressed. Foam adhesive pads 21 are affixed to the sides of an appliance to be mounted, as shown in FIG. 5. The preferred embodiment shown in FIG. 2 illustrates that padded insert 20 can be retained within recess or channel 60 of generally vertical portion 17 of the side bracket, and above threaded fastener rod 18. Vertical portion 17 may also include a pair of opposing inwardly extending vertical flanges or sidewalls 23, while horizontal portion 16 may include a pair of upwardly extending opposing flanges 24. Inserts 20 may also include outwardly extending opposing vertical flanges 27, as well as outwardly extending opposing horizontal flanges (not shown). The lower horizontal flange of insert 20 can then rest on fastener rod 18 when the device is assembled, as explained below. In an alternative embodiment, foam adhesive pad can be double-sided and directly affixed to the inner face of vertical portion 17.

To assemble, the appliance to be mounted is preferably turned over, and the base 11 is reversed and placed on the appliance bottom. Alternatively, the appliance can be directly placed on base 11 without reversing the base. Adhesive pads 21 are then affixed to the appliance sides. Prior to placement of the appliance, fasteners 25 can be inserted through lower base section 12 and upper base section 13 and directly into the support surface, as shown in FIG. 3. Alternatively, a security nut 26 may be used to secure the fasteners, and an arm bracket, as shown in FIG. 7, may be used to mount the appliance to an arm extending from a wall or ceiling, as will be described in more detail below.

Figure 11:
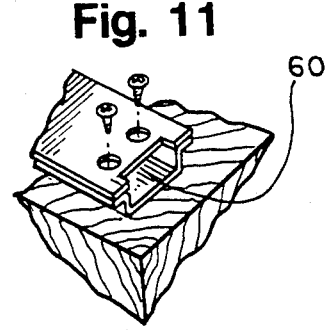
FIG. 11 is a perspective view of a preferred embodiment of the base illustrated in FIG. 9, showing a recess in the upper base section for accommodating a side bracket.

Next, referring again to FIG. 2, the generally horizontal portions 16 of side brackets 15 are slid into the respective ends of the open compartments in the base 11. Referring now to the preferred embodiment of the base shown in FIG. 11, a recess or channel 70 is formed in the base and is appropriately sized to accommodate vertical portion 17 of bracket 15, thus effectively increasing the width over which the device can be adjusted. A first set of threaded fasteners, rods 18, are now inserted through the apertures on the side brackets and into the compartment, mating with and screwing into a second set of fasteners, nuts 14, which are welded to a portion of the base. Nuts 14 preferably consist of threaded nuts sold under the trademark TINNERMAN®. Alternatively, a portion of the base can be bent to depend into the compartment, and either accommodate a TINNERMAN® nut or itself be threaded. With the generally vertical portions 17 of side brackets 15 containing and retaining padded inserts 20, whose inner face is affixed to adhesive pad 21, the fastener rods are now tightened a sufficient amount to ensure that the appliance will be squeezed or clamped between the side brackets to provide a secure mount. Friction pads, which are preferably made of any suitable rubber or rubber-like material such as urethane, can be substituted for the adhesive pads. When friction pads are used, the appliance is still securely mounted, but it can now be easily disengaged from the mount.

Figure 9:
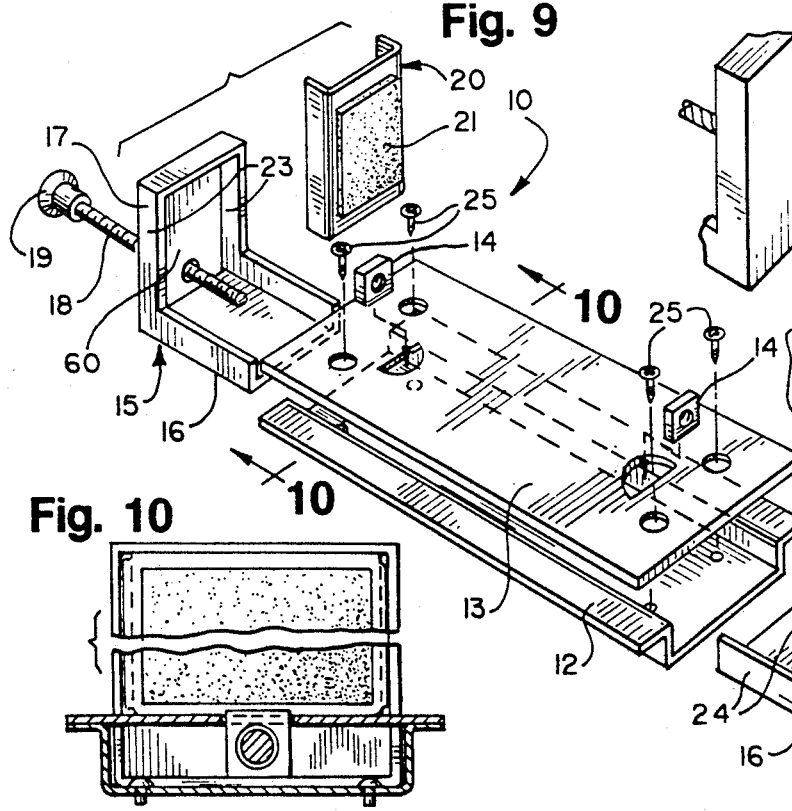
FIG. 9 is a perspective view of various components of a second embodiment of the invention.

While one embodiment of the base, shown in FIG. 2, illustrates the upper base section 13 as an elongated downwardly facing channel-shaped element, and the lower base section 12 as a flat element with upwardly extending flanges or sidewalls about its perimeter for retaining upper base section 13, a second embodiment, shown in FIG. 9, essentially inverts these elements. Thus FIG. 9 illustrates an elongated upwardly facing channel-shaped element which forms lower base section 12, and a generally flat element which forms upper base section 13.

Either of the embodiments shown in FIGS. 2 and 9 are easily adaptable to applications in which the base is to be directly secured to the support surface or, alternatively, in which the base is to be attached to a receiving arm. However, the embodiment shown in FIG. 9 is preferably adapted to mounting an appliance, such as a television, to upper base section 13, since this section is flatter and has a greater surface area, and thus can more easily accomodate an appliance, which may include legs. Lower base section 12 of FIG. 9 could then be mounted to a moveable arm mounted on a wall or ceiling, be directly fastened to a support surface. Conversely, the embodiment shown in FIG. 2 is preferably adapted to mounting and/or locking items, such as business equipment, to a support surface such as end table or counter top. Such equipment is preferably secured using the tab and lower adhesive pad securing means shown in FIG. 8, in conjunction with the base section configuration disclosed in FIG. 2.

Figure 12:
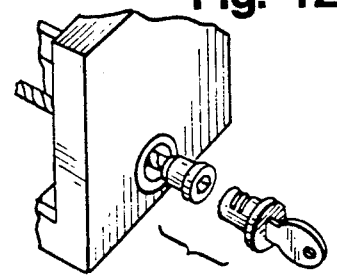
FIG. 12 is an exploded perspective view of one locking means which can be used by the present invention.
Figure 13:
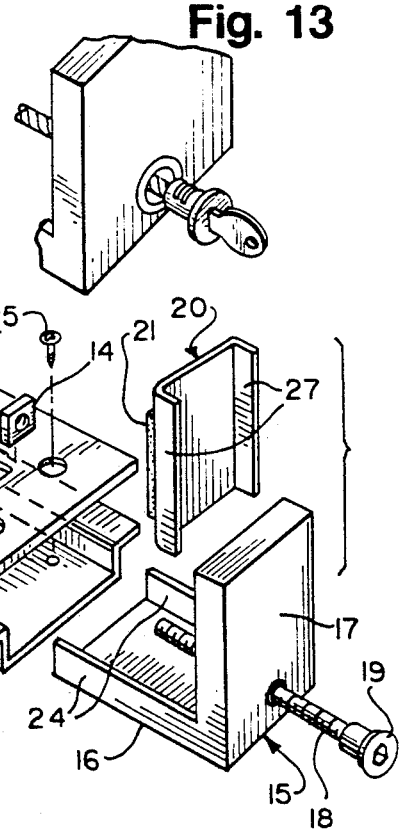
FIG. 13 is an exploded perspective view of one embodiment of the locking means of the invention.
Figure 10:
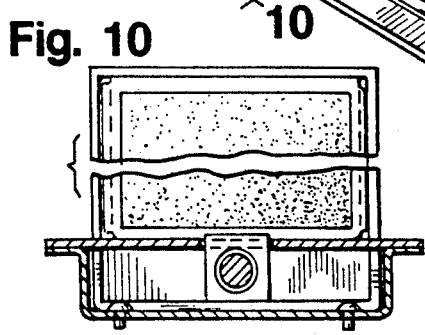
FIG. 10 is an end view taken along section line 10—10 of FIG. 9.

One application of the present invention is for mounting an appliance, such as a television, to a wall mount or other device which includes a fixed or moveable and/or telescoping arm. To accomplish this result, an arm receiver bracket 30, shown in FIG. 7, is rigidly secured or welded to a lower portion of base section 12 of base 11. Once the appliance has been securely mounted between side brackets 15, the appliance can then be further mounted to a receiving arm cooperative with arm receiver bracket 30, or a similar arm receiver. For commercial applications, tip 19 of threaded fastener 18 can be provided with a nonconventional head or opening. "Nonconventional" is defined in this application to mean a polygonal, oblong or other non-standard shaped opening which is not accessible by conventional "phillips" or flat head screwdrivers. A lock can also be provided to fit over the allen head tip 19 of fastener rod 18, as shown in FIG. 12. Only a key can be used to disengage and remove this lock from the fastener rod and expose the allen head tip. Alternatively, in still another embodiment, the fastener rod itself can be provided with a lock at its tip, as shown in FIG. 13. In this way, a key must be inserted into the lock, and only then can the fastener rod be rotated.

Figure 8:
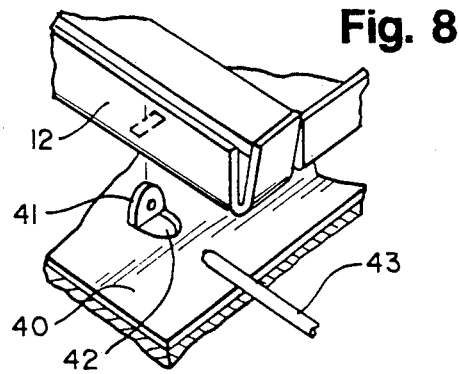
FIG. 8 is an exploded perspective view of the present invention, illustrating the connection of tab means on an adhesive pad to the base.

Another mounting method is shown in FIG. 8. A large foam adhesive pad 40 can be provided beneath the lower portion of lower base section 12 to secure the base to a support surface. Adhesive pad 40 is provided with upstanding tab 41, while the bottom portion of lower section 12 is provided with a slot 42 sized to accommodate tab 41. Once tab 41 is inserted through slot 42, a holding pin 43 can be used to anchor the base to the adhesive pad 40 and the support surface.

Both threaded fastener rods 18 and generally horizontal portions 16 of side brackets 15 can be of any length less than the base length. Therefore, it can be appreciated that an appliance of virtually any size can be quickly, securely and easily mounted to a support surface or a holding arm by the present invention. Appliances with tapering or sloping sides can also be accommodated by side brackets 15 which, in cross-section, have a generally triangular or trapezoidal shape. The sloping inner surface of the side brackets would mate with the sloping appliance sides. Alternatively, horizontal and vertical portions or legs 16 and 17 of the side brackets could be made pivotable by any expedient means (for examples, legs 16 and 17 could be separate parts, joined at their intersection by a retaining bolt). In this way, padded support 20 would be tilted along with vertical leg 17 to accommodate any sloping appliance surface.

It should, of course, be understood that side brackets 15 of the present invention can be made with a variety of sloping or curved portions which can accommodate appliances of many different shapes.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A device for mounting an appliance, comprising:
   a base having upper and lower portions which define a substantially closed compartment, said upper portion adapted to support the appliance and said lower portion adapted to be secured to a support surface;
   at least two side brackets disposed at opposite ends of said base, each of said brackets having a generally horizontal portion adapted to be slidably insertable within said compartment and a generally vertical portion;
   a first set of at least two threaded fasteners, each of said threaded fasteners insertable through each of said side brackets and into said compartment, for urging said brackets toward said appliance to provide a clamping force on said appliance along the length of said first set of threaded fasteners;
   at least two frictional or adhesive pads, each of said pads having opposing faces, one of said faces of each of said pads adapted to contact or attach to the sides of the appliance, and the other face of each of said pads adapted to attach to each of said generally vertical portions of said brackets; and
   a second set of threaded fasteners disposed within said compartment for cooperating with said first set of threaded fasteners to secure said side brackets to the sides of the appliance.

2. The device of claim 1, further comprising locking means, cooperative with said adjusting means, for providing security against theft of the appliance.

3. The device of claim 1, wherein said threaded fasteners include allen head barrels for adjustment.

4. The device of claim 1, wherein said force developing means is double-sided adhesive tape or single-sided adhesive tape.

5. The device of claim 1, wherein said force developing means is a rubber or rubber-like material such as urethane.

6. A device for mounting an appliance on a support surface or arm, comprising:
   a base with upper and lower portions forming an interior compartment, said upper portion constituting a supporting platform for the appliance and said lower portion adapted to be secured to the support surface or arm;
   two side brackets disposed at opposite sides of said base, at least one of said brackets being adapted for slidable insertion into said interior compartment;
   means for developing a frictional or adhesive force between said brackets and the appliance; and
   means for adjusting the spacing of said brackets to conform to the size of the appliance, said adjusting means including a first threaded fastener which is insertable through said bracket and is secured to a second threaded fastener mounted in said compartment, and said adjusting means further being adapted to provide a clamping force along an axis parallel to said first threaded fastener and parallel to a line running between said side brackets.

7. The device of claim 6, further comprising locking means disposed at one end of said first set of fasteners.

8. The device of claim 7, wherein said locking means comprises an allen head barrel located outside of said brackets.

9. The device of claim 6, wherein said insertable side bracket includes a generally vertical portion adapted to engage and retain said force developing means.

10. The device of claim 9, wherein said horizontal and vertical portions of said side brackets are pivotable about the intersection of said portions.

11. The device of claim 6, wherein said force developing means includes at least two frictional or adhesive pads, each of said pads adapted to connect to a side bracket.

12. The device of claim 11, wherein said generally vertical portion of said side brackets includes a pair of opposing vertical flanges which extend inwardly toward the appliance.

13. The device of claim 12, wherein said pads cooperate with a pad support having an attachment surface and a pair of opposing vertical flanges which extend outwardly away from the appliance, said vertical flanges of said pad support adapted to be retained within said side bracket flanges whereby said side bracket functions as a retaining mechanism for said pads and said pad support.

14. The device of claim 13, wherein said vertical flanges of said side brackets include protuberances which facilitate a snap-fit connection with said vertical flanges of said pad supports.

15. The device of claim 6, wherein the lower portion of said base includes an arm receiver.

16. The device of claim 6, wherein said base includes recesses located at each end of said base, each of said side brackets fitting within said recesses to increase the width to which the device can be adjusted.

17. The device of claim 6, wherein a portion of said base depends into said compartment, said depending portion being rigidly connected to a TINNERMAN ® nut.

* * * * *